Patented Jan. 6, 1953

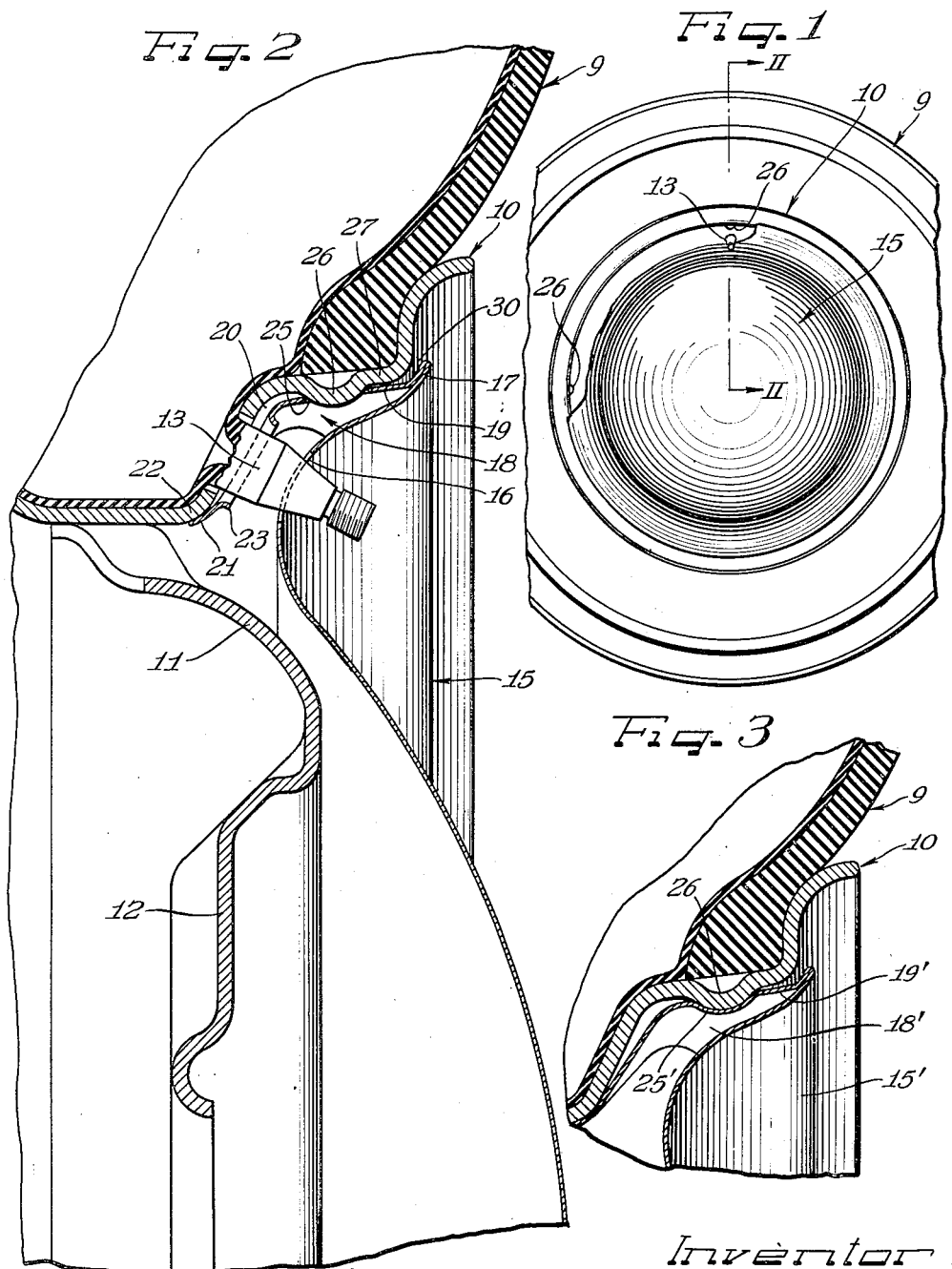

2,624,640

UNITED STATES PATENT OFFICE 2,624,640

WHEEL COVER

George Albert Lyon, Detroit, Mich.

Application August 7, 1948, Serial No. 43,061

6 Claims. (Cl. 301—37)

1

This invention relates to wheel structures and more particularly to an ornamental cover for the outer side of an automobile wheel.

An object of this invention is to provide a wheel cover which may be economically manufactured on a large production basis from sheet material and which can make use of what is normally scrap material at the corners of a blank for the formation of the cover retaining means.

Another object of this invention is to provide a wheel and cover combination wherein portions of the cover and wheel may have interlocking detachable socket-like connections.

Yet another object of this invention is to provide a wheel cover which can be detachably snapped over bumps on the rim of a wheel and wherein the bumps can be socketed in concealed holes in the cover.

In accordance with the general features of this invention there is provided in a cover structure for a wheel including body and flanged tire rim parts with radially inwardly spaced cover retaining bumps on an axial flange of the rim part, a cover comprising a circular member having an underturned outer peripheral edge with spaced rearwardly projecting retaining elements extending axially and radially inwardly from the edge; these elements each including a generally axial portion defining a socket for receiving a bump as the element is resiliently cammed over the bump in the pushing of the cover onto the wheel.

Another feature of the invention relates to utilizing one of the retaining elements as a cover centering means in the provision of an aperture in the element through which the valve stem on the wheel can extend.

Still another feature of the invention relates to providing the socket portion in the element in several different forms, one of which comprises a hole in the element and the other of which comprises a depression in the element.

Other objects and features of this invention will more fully appear from the following detailed description taken in connection with the accompanying drawing which illustrates several embodiments thereof and in which:

Figure 1 is a fragmentary side view of a wheel having a cover embracing my invention applied thereto, a portion of the cover being broken away to show the spaced bumps on the wheel rim;

Figure 2 is an enlarged fragmentary cross-sectional view taken on substantially the line

2

II—II of Figure 1 looking in the direction indicated by the arrows; and

Figure 3 is a fragmentary cross-sectional view similar to Figure 2 but showing a modification of the invention.

As shown on the drawings:

I have employed the reference character 9 to designate generally a conventional pneumatic tire and tube assembly mounted in the usual way upon a multi or stepped flanged tire rim indicated generally by the reference character 10. This rim is supported in the usual way on a dished metallic wheel body 11 which has the usual central bolt-on flange 12 by means of which the wheel may be detachably fastened to the brake assembly on the axle of an automobile.

The tire assembly 9 includes the usual yieldable rubber valve stem 13 and projecting in the usual way through one of the flanges of the tire rim 10 so as to be accessible from the exterior of the wheel.

I have employed the reference character 15 to designate generally an ornamental wheel cover embodying the features of this invention and having an aperture 16 through which the valve stem can extend so that its free end is on the outer side of the cover thereby enabling access to it without necessitating removal of the cover.

This cover 15 may be made from any suitable sheet material although I preferably contemplate making it from sheet steel or stainless steel sheet, which material lends itself to high polish and a lustrous finish.

The main body of the cover is generally of a dished concave convex configuration and is designed to give a very pleasing external appearance to the wheel. It will be perceived from Figure 2 that the cover curves smoothly without sharp bends in toward the valve stem 13 and is then curved outwardly at the center of the wheel into a crown located over the bolt-on flange 12 of the wheel.

The outer peripheral edge of the cover 15 is turned rearwardly at 17 upon itself to form a double thickness edge which reinforces the outer periphery of the cover. This is important since it is the edge 17 that is adapted to be engaged by a pry-off tool such as the end of a screw driver in the ejection of the cover from the wheel. By reinforcing the outer edge as at 17 I am enabled to use much thinner material than would otherwise be possible, thereby enabling a considerable saving in the cost of the material going into the cover.

I contemplate an additional saving by using four corners of the blank from which the cover is stamped to serve as the retaining means of the cover. It will be appreciated that the cover is generally circular and that hence when stamping it from sheet material corners are left in the sheet which would be normally disposed of as scrap.

Accordingly, at the four corners of the cover this scrap material is formed onto four circumferentially equidistantly spaced retaining elements 18 which extend rearwardly behind the cover so as to be concealed thereby. These elements are all identical with the exception that one of them is apertured at 23 to provide a hole through which the valve stem 13 can extend. The numeral 23 designates the flanged edge of this hole which is aligned with the hole 16 in the main body of the cover. This flanged edge is of considerable importance in serving to cooperate with the valve stem in centering the cover on the wheel.

Each of the elements 18 includes a generally axially extending portion 19 which projects directly from and is integral with the turned edge 17 of the cover. The axially extending portion 19 terminates in an inclined generally radially extending portion 20 which terminates in a tip 21 adapted to engage around the bottom corner 22 of the base flange of the rim 10. As noted before, one of the elements 18 has its radial portion 20 provided with an aperture defined by the flanged valve stem engaging edge 23.

The generally axially extending portion 19 of each of the elements 18 is provided with a hole defined by an edge 25 which is adapted to engage the peripheral margin of bump 26 formed in a generally axial flange 27 of the rim 10. In other words the circular edge 25 in the portion 19 of the element 18 serves to define a socket in which the bump is adapted to be seated against the resiliency of the element of finger 18.

As shown in Figure 1 the bumps 26 are circumferentially equidistantly spaced so that there are four of them provided on the rim for cooperation with the four retaining elements 18.

In the application of the cover 15 to the wheel the hole 16 is first aligned with the valve stem 13 and then the cover is manually pressed rearwardly toward the wheel. During the course of this movement of the cover the portions 19 of the retaining elements engage the bumps and are resiliently cammed inwardly until the bumps engage in the holes at 25 at which time the elements 18 spring outwardly so that they have a socket-like engagement with the bumps, thereby resiliently and detachably holding the cover on the wheel.

Of course, as the elements 18 are pushed home, the element with the valve stem hole moves over and around the valve stem, as shown in Figure 2. It is important to note that the holes 16 and 23 of the cover in cooperating with the valve stem serve to not only center the cover on the wheel but also to align the retaining elements 18 with the bumps 26 so that the bumps can engage in the sockets at 25 of the elements.

When the cover is fully pressed home the tips 21 of the retaining elements 18 resiliently engage the base flange of the rim part and provide a cushioned support for the cover on the wheel. This arrangement is such that the outer peripheral edge 17 of the cover is slightly spaced from the adjoining rim flange so as to provide an opening at 30 for receiving the end of a pry-off tool in the prying off of the cover from the wheel. In this regard it is clear that upon engagement of this edge 17 by the tool a slight twisting of the tool will disengage progressively the retaining elements from their engagement with the bumps 26.

In Figure 3 I have illustrated a modification of the invention wherein the same numerals are used to designate the parts of the wheel as the wheel is identical to that of Figures 1 and 2. The cover 15' of this form is also identical to the cover 15 with the exception of the construction of the retaining elements 18'.

The retaining elements 18' are like elements 18 except for the fact that instead of providing holes through which the bumps 26 are adapted to extend, I provide each of the portions 19' with a depression 25' in which a cooperating bump 26 is adapted to be socketed or nested. Otherwise this modification of the cover operates in exactly the same way as the first described form.

I claim as my invention:

1. In a cover structure for a wheel including body and flanged tire rim parts with radially inwardly projecting spaced cover retaining bumps on an axial flange of the rim part, a cover comprising a circular member having an underturned outer peripheral edge with spaced rearwardly projecting retaining elements extending axially and radially inwardly from said edge, said elements each including a generally axial portion defining a socket for receiving a bump as the element is resiliently cammed rearwardly over the bump in the pushing of the cover onto the wheel, one of said elements also having an aperture through which a wheel valve stem can project.

2. In a cover structure for a wheel including body and flanged tire rim parts with radially inwardly projecting spaced cover retaining bumps on an axial flange of the rim part, and one of the rim flanges also having extending therefrom a valve stem, a cover comprising a circular member having an underturned outer peripheral edge with spaced rearwardly projecting retaining elements extending axially and radially inwardly from said edge, said elements each including a generally axial portion defining a socket for receiving a bump as the element is resiliently cammed rearwardly over the bump in the pushing of the cover onto the wheel, said cover member and one of said elements having respective aligned apertures adapted to be aligned with the valve stem and through which the valve stem can extend for centering the cover on the wheel and for aligning the elements with the bumps on the wheel.

3. In a wheel structure including a multi-flange tire rim including base, side and intermediate flanges; a circular cover member having an underturned peripheral margin for overlying the outer side of the intermediate flange of the tire rim, said underturned margin including a plurality of spaced axially inwardly extending tire rim engaging elements each of which includes a generally axially inwardly extending portion to lie adjacent to the inner face of the intermediate flange of the tire rim and a generally radially inwardly extending terminal portion to engage against the side flange portion of the tire rim, said elements and the body of the cover including said marginal portion being formed integrally in one piece from a single sheet of thin material.

4. In a vehicle wheel structure including a multi-flange tire rim having side and intermediate flanges extending respectively generally radially and generally axially, a circular cover member having a peripheral margin of a dimension to overlie the intermediate flange of the tire rim, said margin having therebehind a plurality of individual retaining elements including axially inwardly extending portions having means for retaining engagement with the intermediate flange of the tire rim, and radially inwardly extending terminal portions engageable with the side flange of the tire rim, said elements comprising integral extensions formed in one piece of an underturned marginal flange integral with the body portion of the cover member.

5. In a vehicle wheel structure including a tire rim having a side flange provided with an opening through which a valve stem can project, the tire rim also having an intermediate flange provided with a uniformly spaced series of radially inwardly extending cover retaining bumps, a cover for disposition at the outer side of the wheel, including a cover body having a valve stem aperture and having a series of generally axially inwardly extending retaining elements retainingly engageable in assembly with the retaining bumps on the tire rim, one of said elements having a generally radially inwardly extending extension including an aperture aligned with the valve stem aperture of the cover body and adapted in assembly to center the cover with respect to the valve stem and said retaining bumps.

6. In a vehicle wheel structure including a multi-flange tire rim having base, side, intermediate and terminal flanges wherein the side flange extends generally radially and joins the base and intermediate flanges respectively and the intermediate flange extends generally radially and axially outwardly, the intermediate flange having cover retaining bumps thereon, a circular cover member having a peripheral margin of a dimension to overlie the intermediate flange of the tire rim, said margin having therebehind a plurality of individual retaining elements including axially inwardly extending portions having sockets for retaining interengagement with said bumps and projecting axially inwardly beyond the sockets, and radially inwardly extending terminal portions on said retaining elements engageable with the side flange of the tire rim for defining the axially inward disposition of the cover, said elements comprising extensions from an underturned marginal flange on the cover member.

GEORGE ALBERT LYON.

REFERENCES CITED

The following references are of record in the file of this patent:

UNITED STATES PATENTS

| Number | Name | Date |
|---|---|---|
| 1,944,658 | Griffith | Jan. 23, 1934 |
| 2,076,789 | LeJeune | Apr. 13, 1937 |
| 2,101,923 | Stough | Dec. 14, 1937 |
| 2,127,598 | Horn et al. | Aug. 23, 1938 |
| 2,306,631 | Lyon | Dec. 29, 1942 |
| 2,404,390 | Lyon | July 23, 1946 |